(12) United States Patent
Considine

(10) Patent No.: US 9,027,974 B1
(45) Date of Patent: May 12, 2015

(54) TWO HANDLE LOG AND FIREWOOD PICKUP TOOL

(71) Applicant: Daniel Considine, Rathdrum, ID (US)

(72) Inventor: Daniel Considine, Rathdrum, ID (US)

( * ) Notice: Subject to any disclaimer, the term of this patent is extended or adjusted under 35 U.S.C. 154(b) by 0 days.

(21) Appl. No.: 14/107,354

(22) Filed: Dec. 16, 2013

Related U.S. Application Data

(60) Provisional application No. 61/848,188, filed on Dec. 27, 2012.

(51) Int. Cl.
*B65G 7/12* (2006.01)
(52) U.S. Cl.
CPC ........................................ *B65G 7/12* (2013.01)
(58) Field of Classification Search
CPC ......................................................... B65G 7/12
USPC .............. 294/11, 16, 28, 61, 82.13, 106, 107, 294/117, 118, 164, 173
See application file for complete search history.

(56) References Cited

U.S. PATENT DOCUMENTS

| 314,169 | A | * | 3/1885 | Dimond | 294/117 |
| 604,758 | A | * | 5/1898 | Jeansen | 294/118 |
| 1,191,660 | A | * | 7/1916 | Butler | 294/16 |
| 1,607,204 | A | * | 11/1926 | Linzmaier | 294/118 |
| 1,669,641 | A | * | 5/1928 | Zeitler | 449/62 |
| 2,016,356 | A | * | 10/1935 | Alberg | 294/118 |
| 2,436,053 | A | * | 2/1948 | Mundahl | 294/118 |
| 2,706,131 | A | * | 4/1955 | Matz | 294/16 |
| 3,118,697 | A | * | 1/1964 | Watters | 294/11 |
| 3,384,407 | A | * | 5/1968 | Thrash | 294/16 |
| 4,186,956 | A | * | 2/1980 | Flynn | 294/16 |
| 4,477,113 | A | * | 10/1984 | Lybolt | 294/16 |
| 5,871,244 | A | * | 2/1999 | Langford | 294/16 |

* cited by examiner

*Primary Examiner* — Dean Kramer
(74) *Attorney, Agent, or Firm* — Harpman & Harpman

(57) ABSTRACT

A tool for lifting and carrying wood of a two opposing pointed arm pivoted construction. A drive handle extends from one arm and an offset carrying handle extends from the other arm. Each arm has a curved free end portion terminating in a wood engagement point. The arms are pivoted together at their distal ends with an arm stop extending therebetween preventing the arms from closing completely. The arms respective end engagement points provide for opposing wood end engagement to grip and hold a single log or firewood piece securely therebetween for lifting and carrying until select release by the user.

1 Claim, 3 Drawing Sheets

TWO HANDLE LOG AND FIREWOOD PICKUP TOOL

This application claims the benefit of U.S. Provisional patent application filed Dec. 27, 2012, Ser. No. 61/848,188.

BACKGROUND OF THE INVENTION

1. Technical Field

This invention relates to wood engagement carriers for individual cut logs, such as fireplace wood.

2. Description of Prior Art

Prior art wood handling tools have been developed to aid individuals in picking up and transporting cut logs or firewood short distances. Such devices rely on pinch engagement of the log ends by oppositely disposing pointed jaws typically have poor wood piercing abilities and weak control after engagement.

Such device variations can be seen, for example, in U.S. Pat. Nos. 2,185,561, 3,384,407 and 4,477,113.

U.S. Pat. No. 2,185,561 discloses a wood handling device for logs having a pair of spring urged pincher jaws connected in spaced parallel relation to a human arm engagement fixture having a hand grip and a separate arm band engagement point.

U.S. Pat. No. 3,384,407 illustrates a home fireplace log carrier having multiple pairs of opposing jaw arms pivoted together for holding a log or a group of logs by their opposing longitudinal sides.

Finally, in U.S. Pat. No. 4,477,113 a wood handling tool is claimed for lifting and carrying a piece of wood. The tool has a contoured rod with a gripping member extension slidably positioned thereover for select adjustable positional engagement therealong.

SUMMARY OF THE INVENTION

A two handled log and firewood moving tool for a person having a carrying handle jaw arm portion pivoted to a correspondingly oppositely disposed jaw arm portion having a driver engagement handle extending therefrom. The respective jaw arms have contoured in turned effacing end engagement points that will engage and penetrate the respective ends of a log securely holding it therebetween when so engaged. The driver handle affords log end engagement and release as directed by the user while the caring handle jaw arm portion provides one handled lifting and transport of the log when gripped within the device.

DETAILED DESCRIPTION OF THE INVENTION

Figure 2:
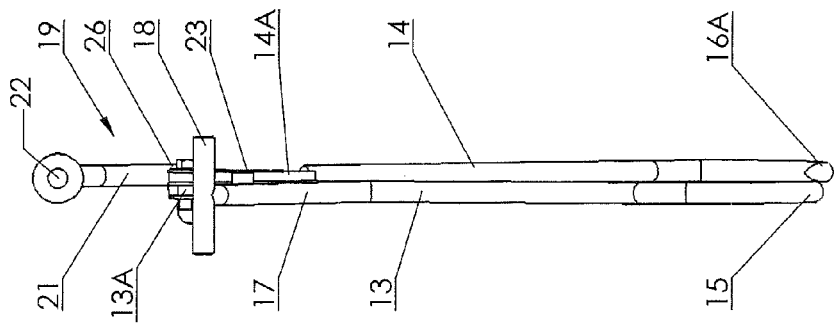
FIG. 2 is an end elevational view thereof on lines 2-2 of FIG. 1.
Figure 1:
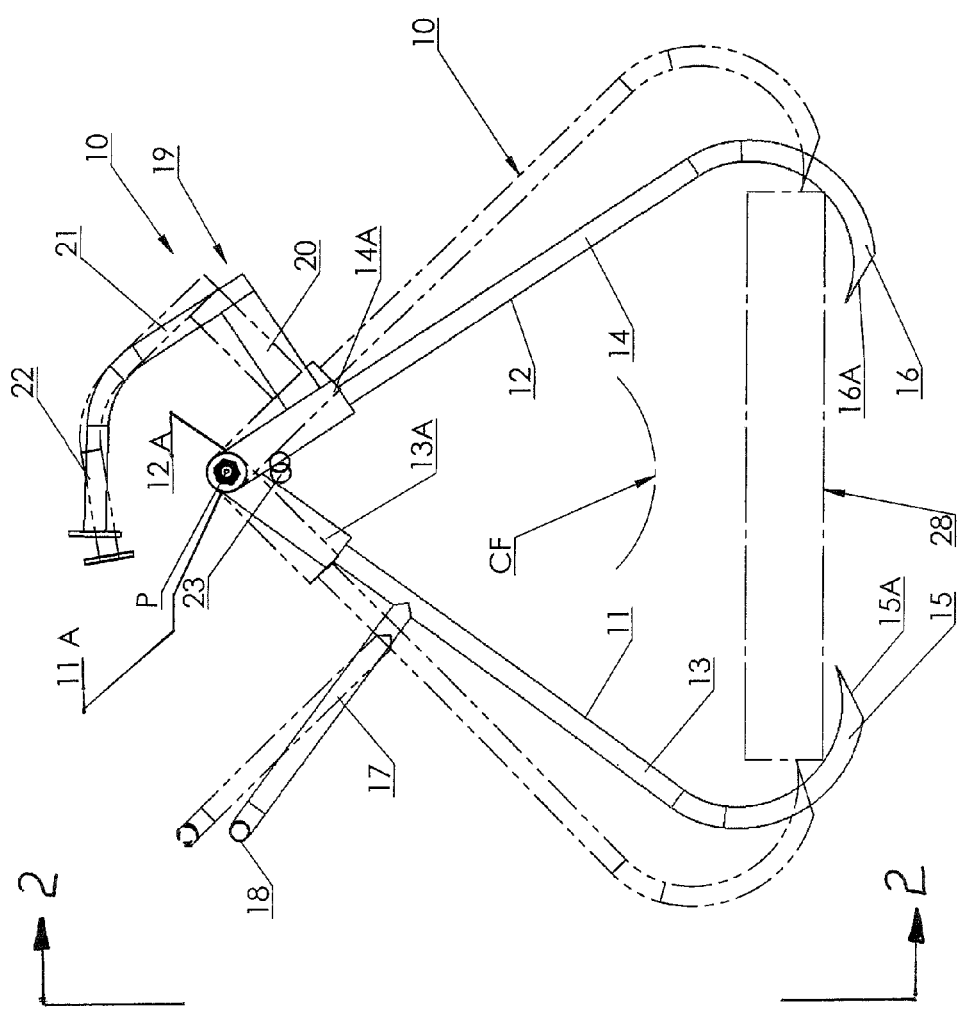
FIG. 1 is a front elevational view of the log and firewood pick-up tool in solid and broken lines in use.
Figure 3:
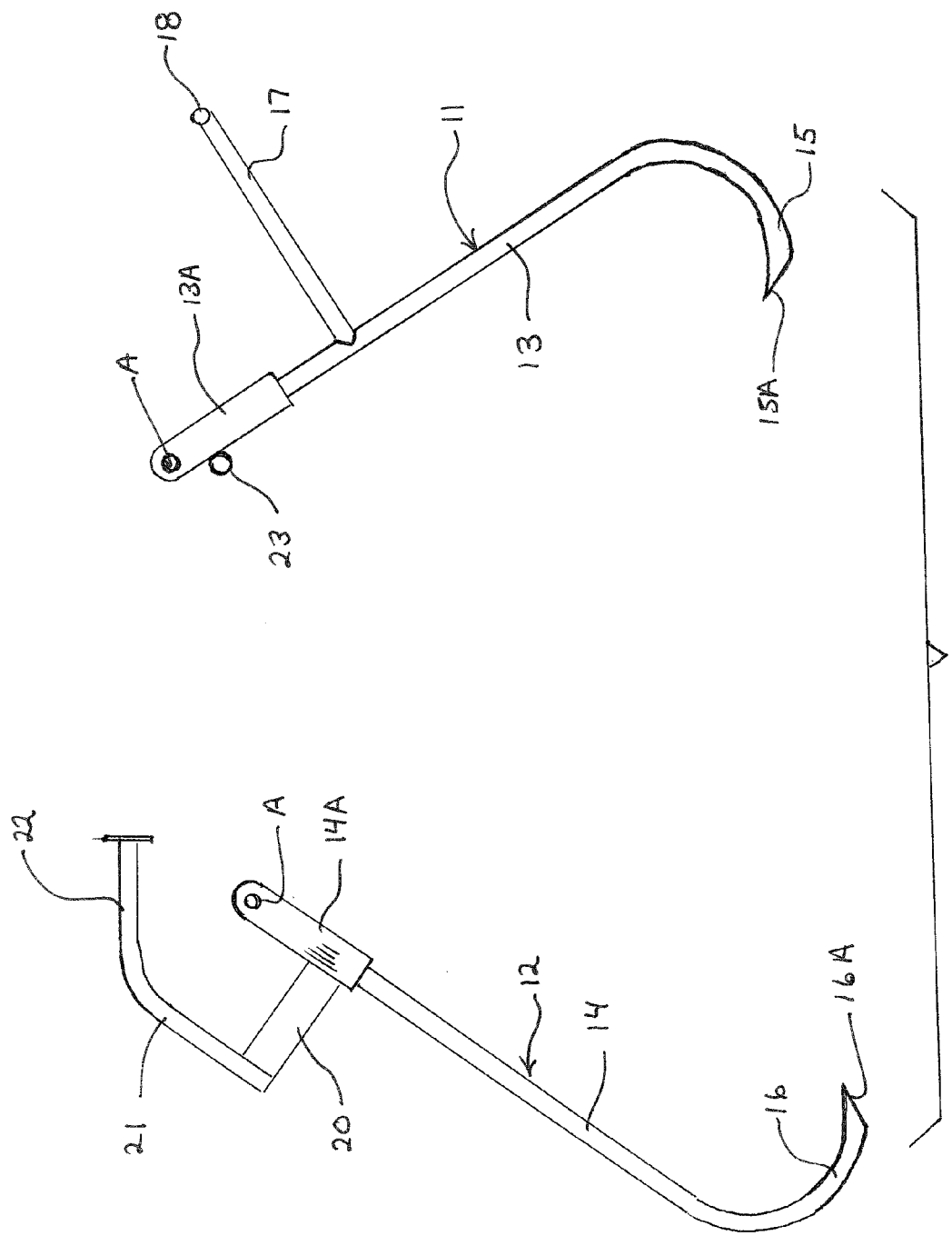
FIG. 3 is an exploded rear elevational view of the log and firewood pick-up tool.
Figure 4:
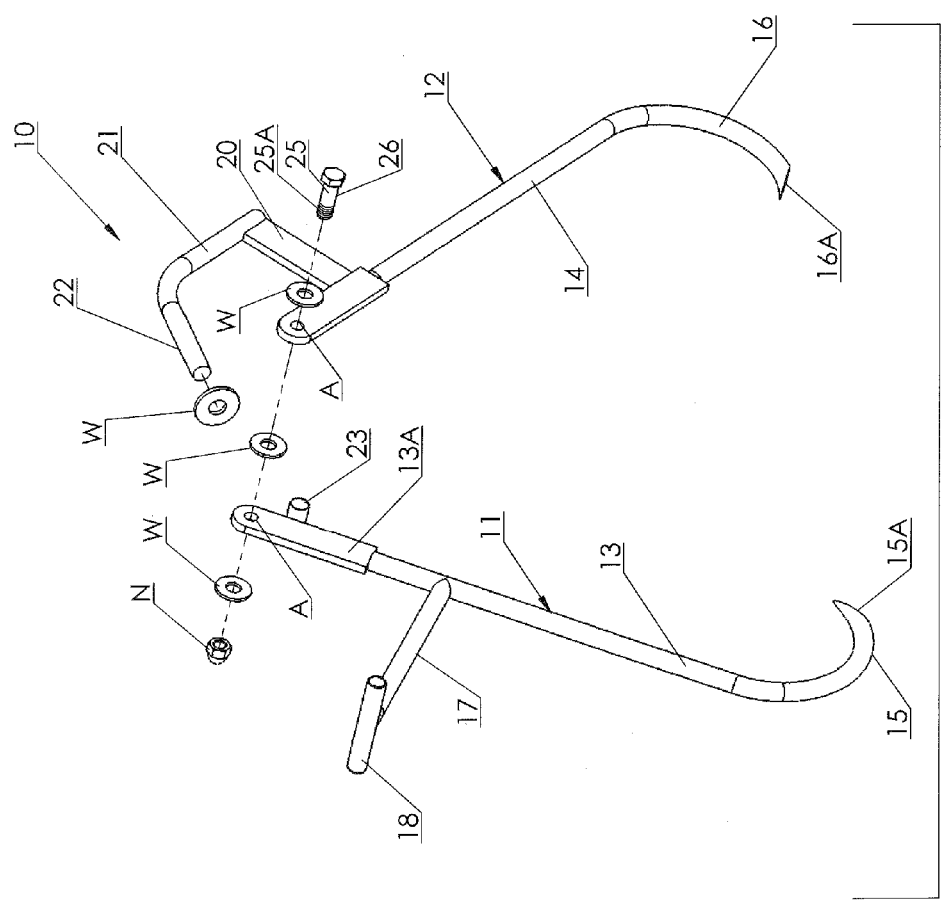
FIG. 4 is an exploded perspective assembly view thereof.

Referring to FIGS. 1, 2 and 4 of the drawings, a log and firewood pick-up tool 10 of the invention can be seen having a pair of movable opposing material engagement arms 11 and 12 pivoted together at their respective distal ends 11A and 12A as best seen in FIG. 1 of the drawings. The arms 11 and 12 are comprised, in this example, of main tubular body members 13 and 14 with respective apertured flattened pivot end support fittings 13A and 14A thereon. Each of the arm's tubular body members 13 and 14 have curvilinear generally effacing end portions 15 and 16 that terminate in respective material engagement end points 15A and 16A.

The engagement arm 11 has a drive handle armature 17 extending at right angles therefrom in spaced longitudinal relation to its flattened pivot end support fitting 13A as best seen in FIG. 4 of the drawings.

A drive handle 18 is secured transversely to the end of the handle armature 17 providing a user (not shown) point of gripping engagement during use as will be described in greater detail hereinafter.

The engagement arm 12 correspondingly has an articulated offset engagement and transport handle assembly 19 extending from its flattened apertured support fitting 14A. The transport handle assembly 19 has a right angularly extending base element portion 20 with a contoured tubular arm 21 forming a handle bar type grip 22 on its free end portion, best seen in FIG. 1 of the drawings.

An arm stop rod 23 is secured to the edge of the apertured flattened end support fitting 13A inwardly of its pivot point P. The arm stop rod 23 is so positioned that it will engage the opposing engagement arms apertured flattened end support fitting 14A limiting its range of travel preventing therefore the respective arms corresponding tubular material engagement end portions 15 and 16 from closing and bypassing one another.

The pivot point P is defined by a threaded pivot pin 25 extending through aligned arm apertures A with multiple spacers and wear washers W between the respective engagement surfaces. The pivot pin 25 is retained by a fastener lock nut N on its freely extending threaded end portion 25A while a non-threaded bearing surface 26 of the pivot pin 25 is provided for engaging the respective material arms 11 and 12 as will be understood by those skilled in the art.

Referring now back to FIG. 1 of the drawings, the pick-up tool 10 of the invention can be seen in broken lines in use wherein a user (not shown) lines up the tool engagement points on the respective ends of a log 28 with the tool end points of the arm 12 which has the extending offset transport handle assembly 19 and the arm 11 having the extending drive handle 18 as hereinbefore described so as to close forcibly on the log 28's ends, capturing the log 28 therebetween. It will be seen that the log 28 when so engaged that due to the offset positioning of the carrying handle assembly 19 in relation to the arm 12, a constant closure force is created indicated in broken lines force arrows CF as the user lifts the log 28 thereby using only one hand as indicated by the broken line force arrow LA.

The pick-up tool 10 of the invention will therefore keep the user from having to bend too deeply to pick-up, engage and move independent logs and provides for ease of handling and carrying. It will also be seen that a utilization of the drive handle assembly 19 with its longitudinally extending pivot point overlying handle bar type grip 22 the intrinsic pivot engagement action afforded thereby will provide the user with log transport control for effective and efficient maneuverability and placement by user.

To release the log when the desired location has been achieved, the user pushes the respective transport handle assembly 19 and the drive handle 18 apart so that the tool 10 will open, releasing the log 28 therefrom.

It will thus be seen that a new and novel two handed log engagement lifting and carrying device has been illustrated and described and is it will be apparent to those skilled in the art that various changes and modifications may be made thereto without departing from the spirit of the invention.

Therefore I claim:

1. A device for handling a piece of wood and the like comprising, a first and second material engagement arms of equal length and transverse diameter pivotally secured at their distal ends to one another defining a pivot point movable from a first non-engagement open position to a second closed engagement position, a drive handle extending from said first engagement arm, said drive handle comprises a support armature at right angles from said first engagement arm and in longitudinal spaced relation to arms pivot point, a handle secured transversely on the free end thereof, a transport handle extending longitudinally in offset angular relation from said second engagement arm in spaced overlying alignment to said engagement arm's pivot point, a contoured tubular hand grip portion on said transport handle, said first and second engagement arms having contoured free end portions with effacing end points formed thereon, an arm stop bar secured to said first engagement arm and means for pivoting said first and second arms comprise aperture flattened pivot end support fittings in aperture aligned overlying relationship to one another and a pivot pin extending therethrough.

* * * * *